(12) United States Patent
Ault et al.

(10) Patent No.: US 6,237,019 B1
(45) Date of Patent: May 22, 2001

(54) METHOD AND APPARATUS FOR PERFORMING A SEMAPHORE OPERATION

(75) Inventors: Donald F. Ault, Hyde Park; John M. Forsythe, Saugerties, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/040,722

(22) Filed: Mar. 18, 1998

(51) Int. Cl.[7] ............................................. G06F 9/00
(52) U.S. Cl. ........................ 709/104; 709/100; 709/107
(58) Field of Search ......................... 710/52, 55, 56; 364/200; 395/725, 650; 709/100, 101, 102, 103, 104, 107, 229, 234; 711/147, 154

(56) References Cited

U.S. PATENT DOCUMENTS

| | | | |
|---|---|---|---|
| 4,316,245 | * 2/1982 | Luu et al. | 364/200 |
| 4,395,757 | * 7/1983 | Bienvenu et al. | 364/200 |
| 5,241,676 | * 8/1993 | Ogle et al. | 395/650 |
| 5,313,638 | * 5/1994 | Ogle et al. | 395/725 |
| 5,922,057 | * 7/1999 | Holt | 710/52 |

OTHER PUBLICATIONS

Fdida et al. "Semaphore Queues: Modeling Multilayered Window Flow Control Mechanisms" IEEE pp 309–317, 1990.*
Enterprise Systems Architecture/390—Principles of Operation SA22–7201–02.
UNIX Network Programming by W. Richard Stevens—pp. 137–152 3.10 Semaphores.
Modern Operating Systems—by A. S. Tanenbaum—pp. 41–43 2.2.5 Semaphores.
Computer Architecture And Organization, Second Edition—by J. P. Hayes—p. 540 and p. 561.
ESA/390 Principles of Operation—7.5.69 via IBM BooKManager 7.5.69 Perform Locked Operation—.
IBM TDB vol. 37, No. 01, Jan. 1994—Data Structure Scheme To Support Emulation . . . Operating System—pp. 417–418.
IBM TDB vol. 38, No. 07, Jul. 1995—Microkernel Semaphores pp. 111–117.

* cited by examiner

Primary Examiner—Majid A. Banankhah
(74) Attorney, Agent, or Firm—William A. Kinnaman, Jr.

(57) ABSTRACT

A semaphore for controlling access to a shared resource in an information handling system is implemented using an atomic operation that compares an operand with a comparison value and, if the operand is equal to the comparison value, replaces the compared operand and up to three additional operands with replacement values. The semaphore has a first semaphore field containing a value and a sequence count and a second semaphore field containing a pointer to a queue for the semaphore. The queue has zero or more entries corresponding to waiters for the semaphore, each entry with a next entry having a pointer to that next entry. To implement the semaphore, a previous value of the first semaphore field is saved as a comparison value. A first replacement value containing an incremented sequence count is generated for the first semaphore field as a first operand in accordance with the specified operation. A second replacement value for the second semaphore field and a third replacement value for one of the queue entries are generated as second and third operands if the queue is being modified. The current value of the first semaphore field is thereafter compared with the comparison value including the sequence count to see if the current value matches the comparison value. If it does, then, atomically with the comparing step, the first operand is replaced with the first replacement value and, if the queue is being modified, one or both of the second and third operands are replaced with their corresponding replacement values. If the current value of the first semaphore field does not match the comparison value, the semaphore operation is retried, using a newly saved value of the semaphore field as a comparison value.

20 Claims, 13 Drawing Sheets

OLD SEMOP LOGIC TO OBTAIN SEMAPHORE —310
　OBTAIN INTERNAL LOCK TO SERIALIZE SEMAPHORE ACCESS —312
　　IF SEMAPHORE AVAILABLE —314
　　　GRANT SEMAPHORE —316
　　　RELEASE INTERNAL LOCK —318
　　　RETURN —319
　　ELSE SEMAPHORE NOT AVAILABLE —320
　　　RELEASE INTERNAL LOCK —322
　　　SUSPEND CALLER —324
　　　(RESUMED BY A CALL TO SEMOP +1) —326
　　　　START OVER —328

OLD SEMOP LOGIC TO RELEASE SEMAPHORE —340
　OBTAIN INTERNAL LOCK TO SERIALIZE SEMAPHORE ACCESS —342
　　MODIFY SEMAPHORE —344
　　　IF ANY WAITERS, RESUME 1ST —346
　　　RELEASE INTERNAL LOCK —348
　　　RETURN —350

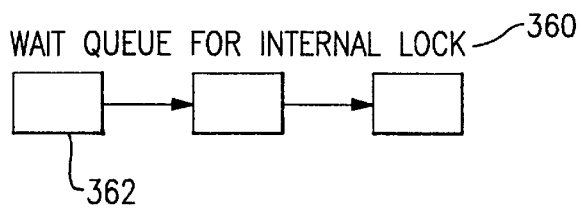

WAIT QUEUE FOR INTERNAL LOCK —360
　　　　　　　　　　　　　362

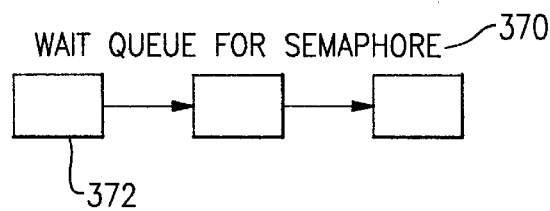

WAIT QUEUE FOR SEMAPHORE —370
　　　　　　　　　　　　　372

FIG.3

METHOD AND APPARATUS FOR PERFORMING A SEMAPHORE OPERATION

BACKGROUND OF THE INVENTION

1. Field of the Invention

This invention relates to a method and apparatus for performing an operation on a semaphore and, more particularly, to a method and apparatus for performing an operation on a binary semaphore.

2. Description of the Related Art

In the world of computing, there is a well-known serialization mechanism, known as a semaphore, used to serialize access to a shared resource. A semaphore is an integer that can vary between zero and some predetermined positive number n, where n is the number of requesters allowed simultaneous use of the resource. In the case of a binary semaphore, n=1 and only one requester can use the resource at a time. Initially the semaphore value is set at n. To obtain access to a resource, a requester (e.g., a unit of work such as a process or a thread) tests the current value of the semaphore. If the current value is greater than zero, the requester decrements the current value by one and proceeds to use the resource. If the current value is zero, on the other hand, the requester is suspended (i.e., goes to sleep) and is put in a queue as a waiter for the semaphore. To release a resource, the requester increments the semaphore value by one. In addition, if there are any waiters in the queue for the semaphore, one of the waiters is posted, whereupon it again attempts to obtain the resource by testing the semaphore as it did initially. Semaphores were first proposed by E. W. Dijkstra in 1965 and are described in such publications as A. S. Tanenbaum, *Modern Operating Systems* (1982), pages 41–43; J. P. Hayes, *Computer Architecture and Organization* (1988), page 540; and W. R. Stevens, *UNIX Network Programming* (1990), pages 137–152, incorporated herein by reference.

There are two main types of semaphores: counting semaphores (n>1) and binary semaphores (n=1). This specification will describe the problems inherent in many semaphore implementations and then describe a high-performance semaphore implementation of the present invention. Although the invention is not limited to a binary semaphore, the description will be primarily in terms of such a semaphore.

FIG. 1 shows a C language example of a semaphore set. A semaphore set is initially created when the C program calls the semget function. (The description in terms of the C source language is for convenience of explanation. The code that actually executes the steps is of course the object code produced by compiling the source code.) The caller defines how many semaphores 120 are in a semaphore set 115. At the time a semaphore set is created, a semid (semaphore id) is returned to the caller. This semid is then used on each subsequent call to the semop function. The operating system keeps track of the semaphore sets in a table 105, where each entry 110 and associated semaphore set 115 are kept track of.

FIG. 2 provides a general description of how semaphore processing works conventionally. The figure shows process 1 (205) and process 2 (210) contending for the same semaphore. The general behavior of binary semaphores is that the semaphore value is initialized to 1 (available). When an application wants to obtain the semaphore, it does a semop(−1) to decrement the value of the semaphore. The main rule of semaphores is that the semaphore value is not allowed to go negative. So the first caller of semop to decrement the semaphore value to 0 owns the semaphore. Any subsequent request to decrement the semaphore will result in the caller being suspended.

So process 1 205 calls semop(−1) (step 220). This gets into the kernel 215 for semaphore processing. The kernel looks at the state of the semaphore and sees that it is currently at a value of 1. The kernel decrements the semaphore value, changing it from 1 to 0, thus granting access to process 1 (step 222). The kernel then returns to process 1 (step 224). Process 1 now is able to access whatever critical resource is protected by the semaphore (step 226). This resource may be memory, a file on DASD or just a critical section of code that cannot execute concurrently in multiple processes.

While process 1 owns the semaphore, process 2 (210) also requests a semop(−1) against the same semaphore (step 228). The kernel cannot perform the −1, since the value is currently 0 and cannot go negative. So the kernel suspends the caller (process 2) (step 230).

Eventually, process 1 finishes accessing the critical resource and performs a semop(+1) (step 232). The kernel modifies the semaphore value from 0 to 1, which causes the suspended process 2 to be resumed (step 234). The kernel running on behalf of process 2 then modifies the semaphore value from 1 to 0 (step 236), thus granting ownership of the semaphore to process 2. Process 2 then can access the critical resource (step 240). After posting the first waiter, control is returned to the caller (step 238). When process 2 is done accessing the resource, it issues a semop(+1) to free up the semaphore (step 242). The kernel modifies the semaphore value from 0 to 1, making it available. Since there are no waiters for the semaphore, control is returned to the caller (step 244).

This was a logical explanation of how semaphore processing operates. When running in a symmetric multiprocessor (SMP) environment, processes running on different central processing units (CPUs) can be concurrently attempting to obtain or free the semaphore. FIG. 3 shows the complications that can occur with a conventional semaphore implementation.

In order for the kernel semaphore logic to atomically update the semaphore value and maintain the wait queue, it is necessary for the kernel to obtain some form of lock or mutex. There are many forms this can take, and it is not unique to any particular platform. When the kernel owns this lock, other callers of semop will be suspended waiting for this lock. This lock is very similar to the concept of semaphores.

In FIG. 3, the first block of pseudocode describes the processing in semop to perform a semop(−1) or an obtain of the binary semaphore (step 310). The first step is to obtain a lock to serialize the semaphore structures (step 312). If this lock is not available, the system suspends the calling thread and places it on a lock wait queue 360 by creating a queue element 362 to represent the process. When this lock becomes available, this process is resumed and can continue past step 312 knowing that the semaphore structures will not change while it is processing. If the semaphore is available (step 314), the kernel grants the semaphore to the caller by modifying the semaphore value (step 316). Then the kernel releases the internal lock (step 318), which may cause other processes that are on the wait queue 360 to be resumed. Control then is returned to the caller (step 319).

If the semaphore value is not available (step 320), then the kernel releases the internal lock (step 322) and suspends the caller by adding a semaphore waiter element 372 to the semaphore wait queue 370 (step 324). When this process is resumed (step 326), it starts over at step 312 (step 328).

When a process calls semop(+1) to release a binary semaphore (step 340), the kernel first obtains the internal lock to serialize access to the semaphore structures (step 342). If this lock is not available, the system suspends the calling thread and places it on the lock wait queue 360 by creating a queue element 362 to represent the process. When this lock becomes available, this process is resumed and can continue past step 342 knowing that the semaphore structures will not change while it is processing. The kernel then modifies the semaphore value by incrementing it by 1 (step 344). If there are any waiters 372 on the semaphore queue 370, then the first element 372 is removed and the process that it represents is resumed (step 346). Then the kernel releases the internal lock (step 348), which may cause other processes that are on the wait queue 360 to be resumed. Control is returned to the caller (step 350).

Now consider a pathological example. Say 500 processes concurrently request a semaphore. One process successfully obtains the internal lock and 499 processes are suspended and added to the wait queue 360 for the internal lock. Then the first process releases the internal lock and one by one, each of the processes obtains the lock, only to find the semaphore unavailable (at step 320) and be suspended a second time, this time on the semaphore wait queue 370. Now in the middle of this processing of the 499 processes, the first process is ready to release the semaphore. Since releasing the semaphore also requires the same internal lock (at step 342), this process is put at the end of the wait queue 360 for the internal lock. This guarantees that each process wakes up simply to get moved from the internal lock wait queue 360 to the semaphore wait queue 370.

To put this in the form of an analogy, imagine a line of people waiting to buy a ticket to a show. As each person gets to the head of the line, they are told there that are no tickets available, but that they can wait on line until someone cancels. Along comes a person who wants to cancel their ticket, but must wait on the same line for all the people who want to buy one. Now repeat this over and over and you have a lot of senseless waiting. In a computer system, this shows up as bad performance and limited capacity.

SUMMARY OF THE INVENTION

The present invention contemplates a semaphore for controlling access to a shared resource in an information handling system that is implemented using an atomic operation that compares an operand with a comparison value and, if the operand is equal to the comparison value, replaces the compared operand and up to three additional operands with replacement values. In accordance with the invention, the semaphore has a first semaphore field containing a value and a second semaphore field containing a pointer to a queue for the semaphore. The queue has zero or more entries corresponding to waiters for the semaphore, each entry with a next entry having a pointer to that next entry. To implement the semaphore, a previous value of the first semaphore field is saved as a comparison value. A first replacement value is generated for the first semaphore field as a first operand in accordance with the specified operation. A second replacement value for the second semaphore field and a third replacement value for one of the queue entries are generated as second and third operands if the queue is being modified. The current value of the first semaphore field is thereafter compared with the comparison value to see if the current value matches the comparison value. If it does, then, atomically with the comparing step, the first operand is replaced with the first replacement value and, if the queue is being modified, one or both of the second and third operands are replaced with their corresponding replacement values. If the current value of the first semaphore field does not match the comparison value, the semaphore operation is retried, using a newly saved value of the semaphore field as a comparison value.

Preferably, the first semaphore field also contains a process ID (PID) identifying the last process to update the semaphore and a sequence number that is incremented each time the semaphore is updated. While the invention is not limited to any particular platform or to binary semaphores, a preferred embodiment of the invention implemented on the IBM System/390™ (S/390™) hardware platform uses the new S/390 hardware instruction Perform Locked Operation (PLO) for serialization of the most commonly used type of semaphore behavior, binary semaphores.

The compare and swap form of the PLO instruction allows for a field to be replaced if it has not been changed since a comparison copy was obtained from the field as well as replacing up to three other fields. Although in general the invention is not limited to binary semaphores, by restricting an implementation to binary semaphores, the fields that need to be modified on a semaphore change can be limited to the maximum of four allowed by the PLO instruction. Using the PLO instruction, the semaphore value and updates to the semaphore wait queues can be serialized on one atomic instruction. Binary semaphore rules are:

1. The number of semaphore operations on a semop( ) is one.
2. The semop( ) value must be +1 when the semaphore value is 0 or a −1 with a semaphore value of 0 or 1.
3. SEM_UNDO is not allowed on a semop( ).
4. A semctl( ) setval or setall value can only be 0 or +1 with restrictions on when setall can be done; it cannot be set from 1 to 0 or 0 to 0, only 0 to 1.

Any violation of the rules for this extension causes the requested operation to fail. The vast majority of semaphore usage that we have observed already follows these rules.

The use of a sequence number that gets-incremented on every semaphore value or semaphore wait queue change and is part of the target of a PLO compare and swap allows for the detection of any changes made to the semaphore between the setup of a change and the actual change. If no changes have occurred then the update takes place. If a change did occur then the update is not made and the setup is done again.

As a particular example of the operation of the present invention, suppose that a unit of work (e.g., a thread) requests a binary semaphore. The thread gets a copy of the compare and swap area, which includes the sequence number and the semaphore value. It then determines if the semaphore is held. Let's say that it is. The thread then looks at the wait queue. Let's say that there are no waiters on the wait queue. The thread sets up the compare and swap parameters so that the sequence number is incremented and the head and tail pointers of the wait queue point to this thread. The compare and swap instruction is then executed. If successful, the sequence number is updated and the wait queue pointers point to this thread. This thread then suspends. If the compare and swap instruction is not successful, the thread goes back and starts the procedure over. Most likely, either the semaphore was released or the wait queue was updated. If the semaphore is now available, the thread sets up to change the semaphore value and increment the sequence number. If it was the wait queue that changed, the thread sets up to add itself to the end of the wait queue. In either case, the compare and swap instruction is then executed and, if not successful, the thread goes back and tries again.

Here is the same obtain semaphore flow from above with the PLO compare and swap instruction:

1. A unit of work (e.g., a thread) issues a semop request to obtain a semaphore (semop−1).
2. The kernel saves compare and swap data (semaphore value, sequence number and process ID of last process to update semaphore). If the semaphore is not available (semval 0), then the kernel sets up to place the work unit on a wait queue and increment the sequence number.
3. The kernel uses the PLO compare and swap and store instruction (up to three additional fields can be stored) to place the work unit on the semaphore wait queue and update the sequence number. The update is done if the compare and swap data has not changed. If the compare and swap data has changed, then the kernel goes back to the previous step.
4. The work is suspended (i.e., waits).
5. The work unit is eventually posted (made ready to run).
6. The kernel saves compare and swap data (semaphore value, sequence number and process ID of last process to update semaphore). If the semaphore is available (semval 1, wait queue empty or this thread posted), then the kernel sets up to set the new semaphore value (semval 0) and increment the sequence number.
7. The kernel uses the PLO compare and swap and store instruction to remove the work unit from the semaphore wait queue, set the new semaphore value and update the sequence number. The update is done if the compare and swap data has not changed. If the compare and swap data has changed, then the kernel goes back to the previous step.
8. The kernel exits to the caller.

Similarly, the release flow with the present invention is as follows:

1. A unit of work issues a semop request to release a semaphore (semop +1)
2. The kernel saves compare and swap data (semaphore value, sequence number and process ID of last process to update semaphore) and sets up to set the new semaphore value (semval 1) and increment the sequence number. If the wait queue is not empty, the kernel also sets up the first waiter to be removed.
3. The kernel uses the PLO compare and swap and store instruction to set the new semaphore value, update the sequence number and remove the first waiter if the queue is not empty. The update is done if the compare and swap data has not changed. If compare and swap data has changed, then the kernel goes back to the previous step.
4. The kernel posts the first work unit on wait the queue.
5. The kernel exits to the caller.

As may be seen from this example, with the present invention there is only one suspend if the semaphore is not available instead of possibly three. The release of the semaphore doesn't wait for a lock. In a typical implementation, the number of instructions to obtain a semaphore using the old method (worse case) is on the order of 30,000, versus about 400 instructions for the present invention.

BRIEF DESCRIPTION OF THE DRAWINGS

FIG. 3 shows the logic flow for conventional semaphore processing.

DESCRIPTION OF THE PREFERRED EMBODIMENT

FIGS. 4 through 13 describe the invention. The primary result of the invention is the provision of semaphores without an additional lock.

Figure 1:
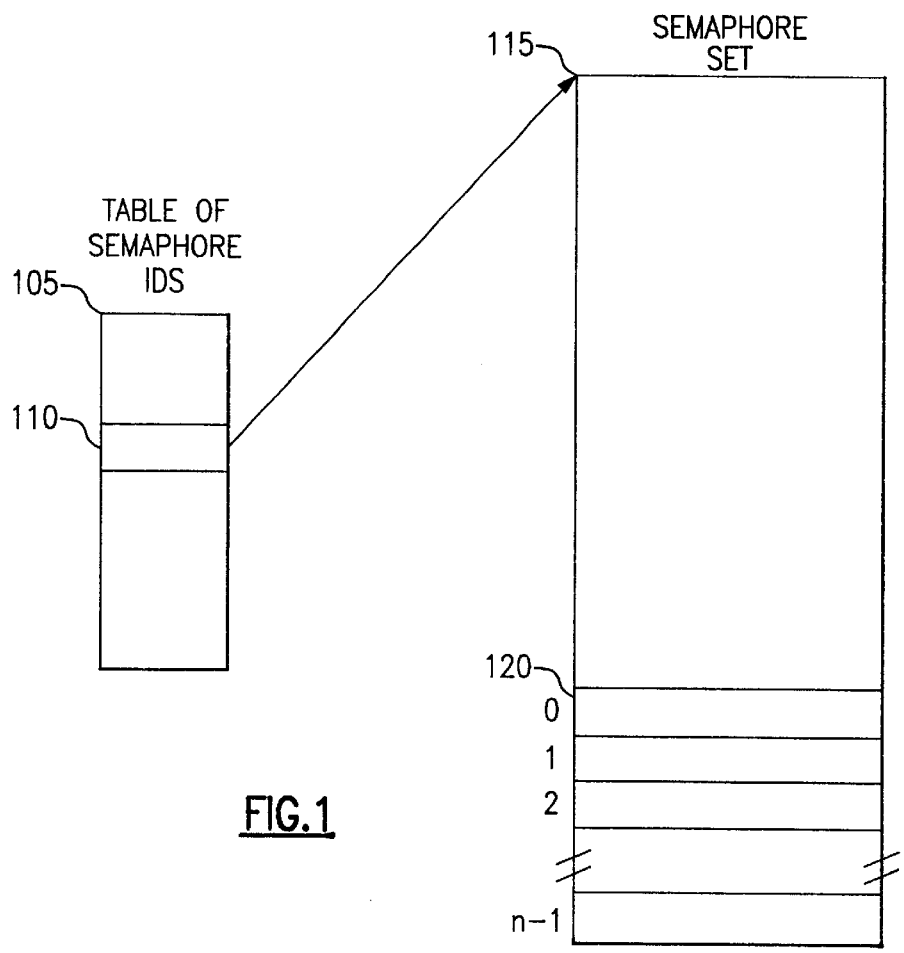
FIG. 1 shows the infrastructure for a kernel managing multiple semaphore sets.
Figure 4:
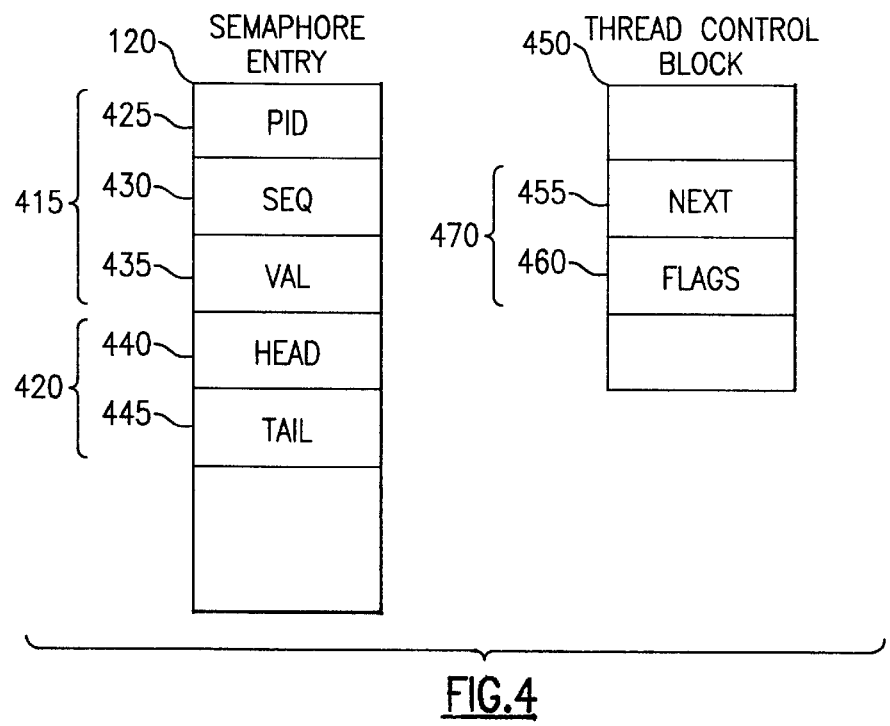
FIG. 4 shows the structure of an individual semaphore in a semaphore set and a thread control block which represents an executable unit of work.

FIG. 4 shows the structure of a semaphore 120 in a semaphore set 115 (FIG. 1). The part of this structure that is thought of as the semaphore 415 is comprised of a process ID (PID) 425, a sequence number (SEQ) 430 and a semaphore value (VAL) 435. In the preferred embodiment, semaphore field 415 is a double-word (64-bit) field comprising a four-byte (32-bit) PID 425, a two-byte sequence number 430 and a two-byte semaphore value 435. Along with the semaphore, there are queue anchors (or queue header) 420 that are used to keep track of threads that are waiting for the semaphore. The waiter queue 370 (FIG. 3) is managed as a single-threaded, double-headed queue. This requires a pointer 440 to the head of the queue 370 and a pointer 445 to the tail (last entry 372) of the queue. In the preferred embodiment, queue header 420 is a double-word field comprising a four-byte head pointer 440 and a four-byte tail pointer 445.

Figure 2:
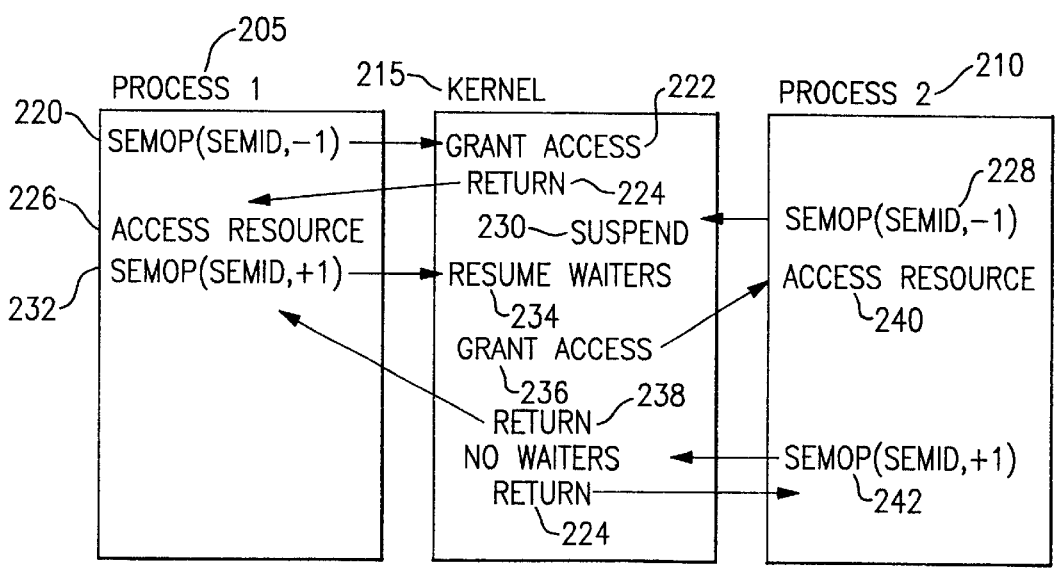
FIG. 2 shows the interaction between two processes requesting the same semaphore.

In this specification, a unit of work is called a thread (there can be one or more threads in a process, but this does not affect the design). The thread is tracked by the operating system (OS) kernel 215 (FIG. 2) with a thread control block 450. A portion 470 of the thread control block 450 is used to keep track of the thread's involvement with semaphores. In this semaphore area 470 there is a forward pointer (NEXT) 455 used for the waiter queue 370 and a set of flags 460 used in the semaphore processing. The primary flag in this area indicates whether that thread control block is on a wait queue. In the preferred embodiment, thread control block portion 470 is a double-word field comprising a four-byte forward pointer 455 and a four-byte flags area 460.

As described earlier, a semop(-1) is used to obtain ownership of the semaphore and a semop(+1) is used to release ownership of the semaphore. The high-level flow for semop is shown in FIGS. 5A through 5D.

Figure 5A:
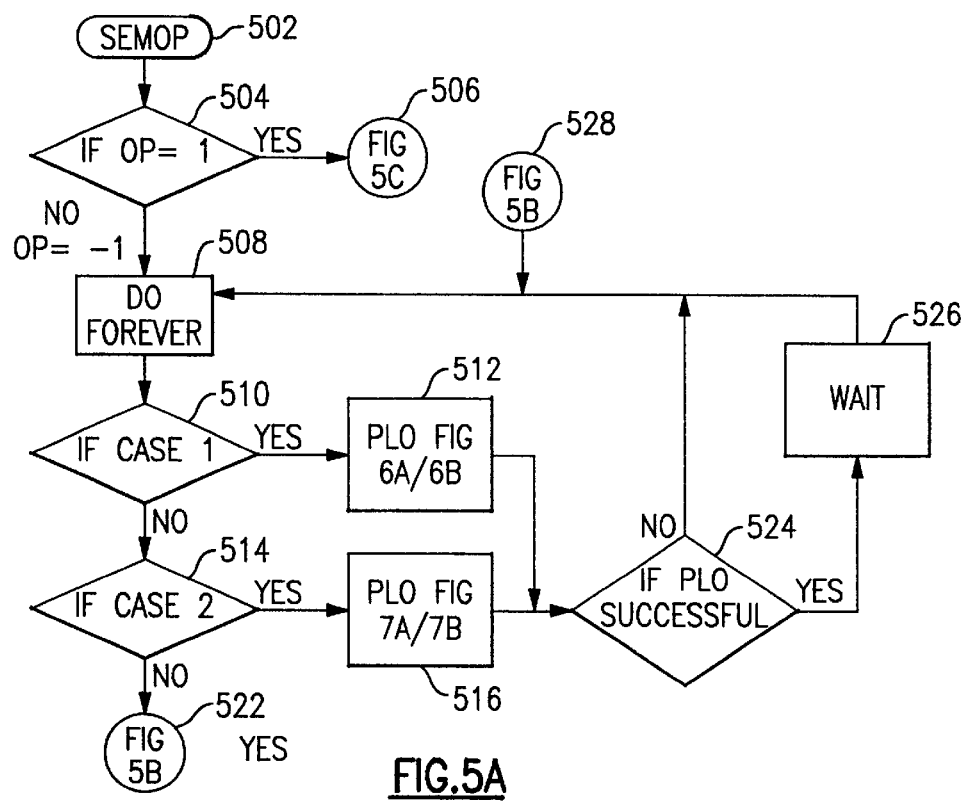
FIG. 5A shows the logic flow for semaphore processing in accordance with the present invention. This shows entry to the semop function and the processing for when the semaphore is not available.

FIG. 5A shows entry to the semop function (step 502). During early semop processing, the semaphore logic locates the semaphore set 115 by looking up the semid 110 in the table 105 of semaphore ids. Then it locates the specific semaphore 120 based on the semaphore number passed on the semop call. These are conventional steps of semaphore processing and not part of the present invention. Other conventional steps that are not part of the present invention and therefore not described in detail are validity checking the caller's parameters and permission checking for user access to the semaphore set. It is the processing of the semaphore that will be focused on next.

Figure 5C:
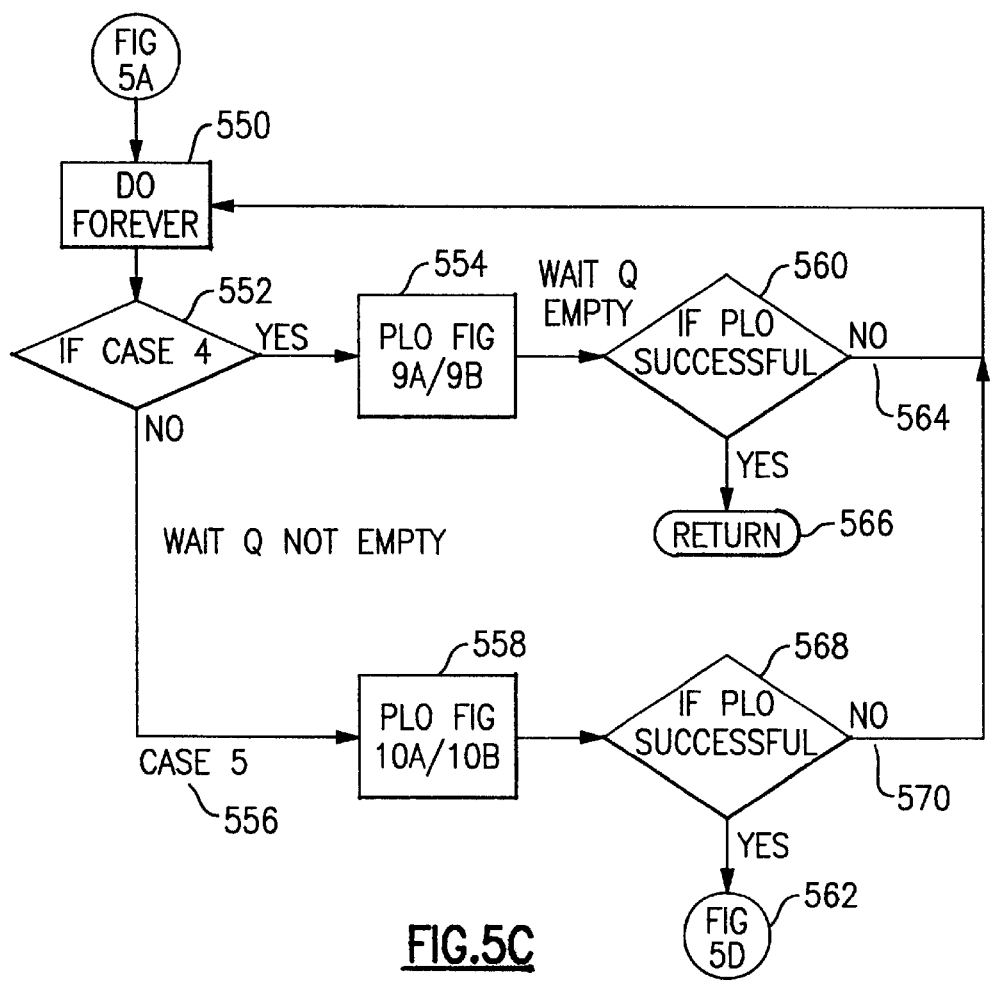
FIG. 5C continues the logic of semaphore processing for a release of the semaphore. Two cases are where there is and is not a waiter for the semaphore. If there is a waiter, it is removed from the wait queue.
Figure 6A:
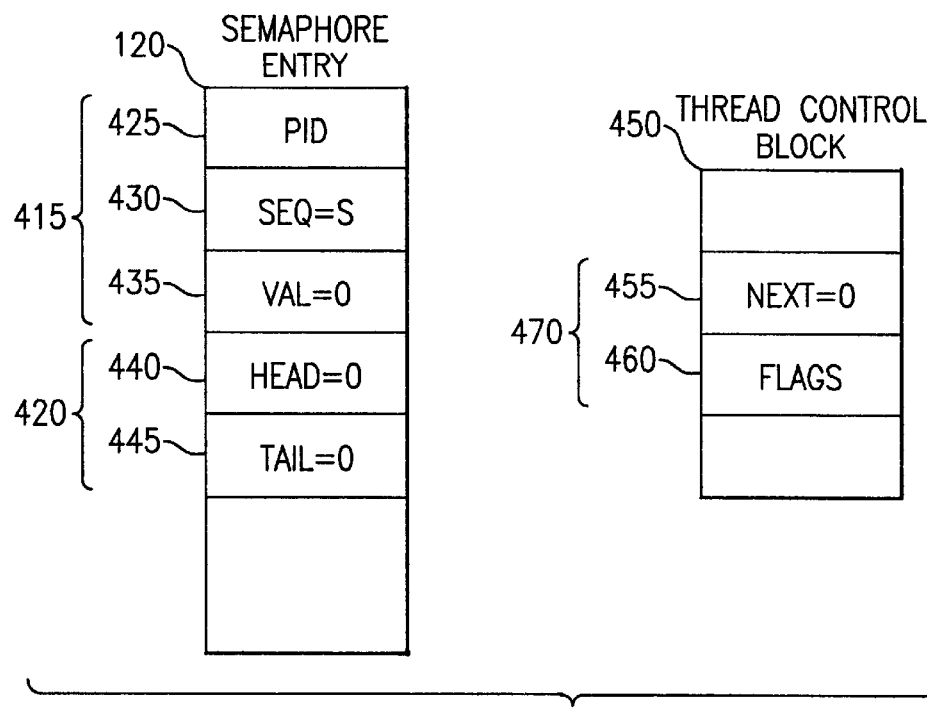
FIG. 6A shows a request for the semaphore when the semaphore is not available and the wait queue is empty, before the compare and swap operation.
Figure 6B:
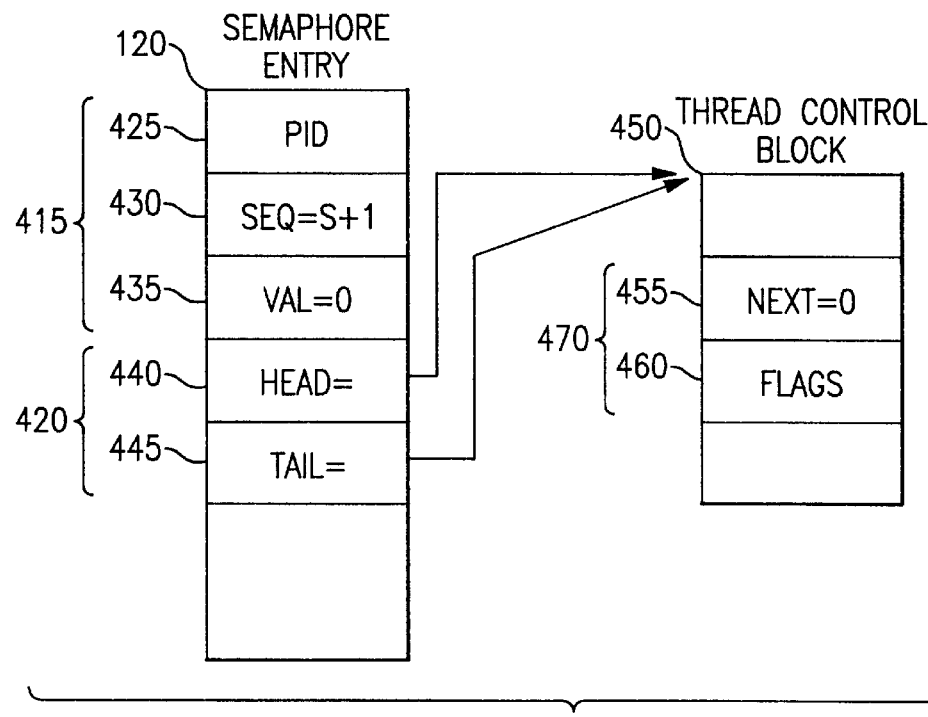
FIG. 6B shows a request for the semaphore when the semaphore is not available and the wait queue is empty, after the compare and swap operation is successful.

The first thing semop processing does is determine whether this is an obtain (-1) or release (+1) (step 504). If it is a release (OP=1), then the semop processing is as shown in FIG. 5C (step 506). If the request is to obtain the semaphore (OP=-1), then an infinite loop is entered until the semaphore is obtained (step 508). The processing is broken up to deal with the various possible states of the semaphore. The test shown as case 1 (step 510) determines that the semaphore is not available (semval=0) and the wait queue 370 (as indicated by head pointer 440) is empty. In this case, the processing is as shown in FIGS. 6A–6B (step 512).

Figure 7A:
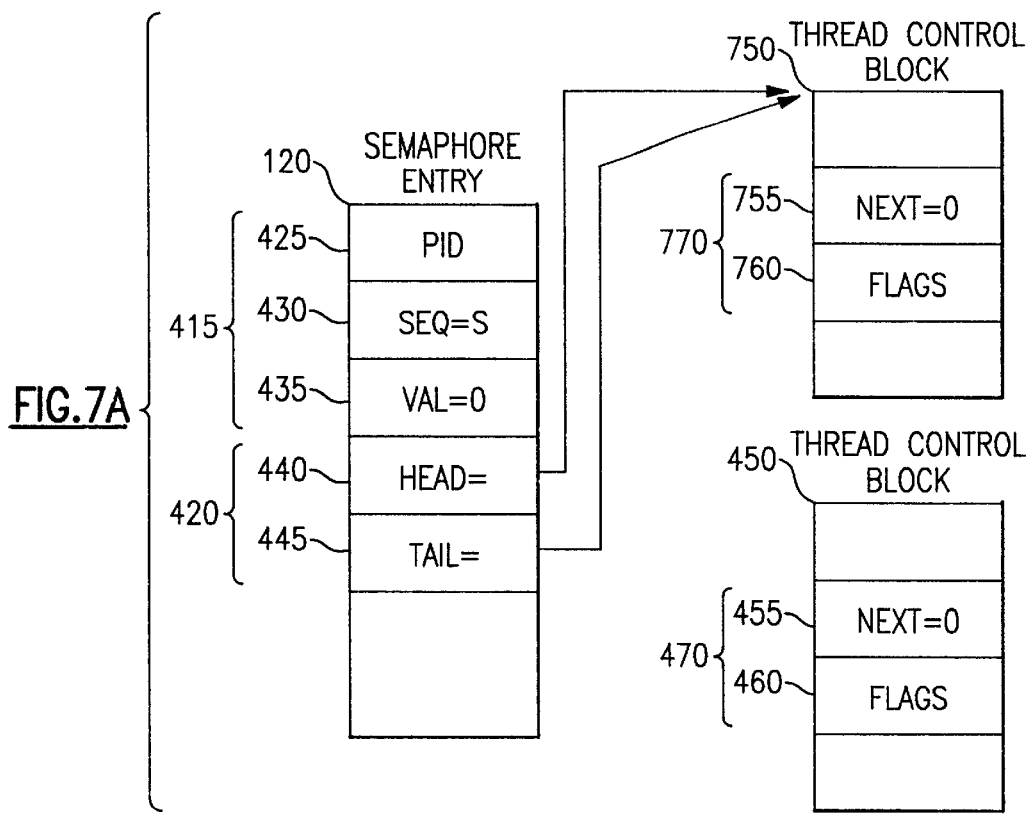
FIG. 7A shows a request for the semaphore when the semaphore is not available and the wait queue is not empty, before the compare and swap operation.
Figure 7B:
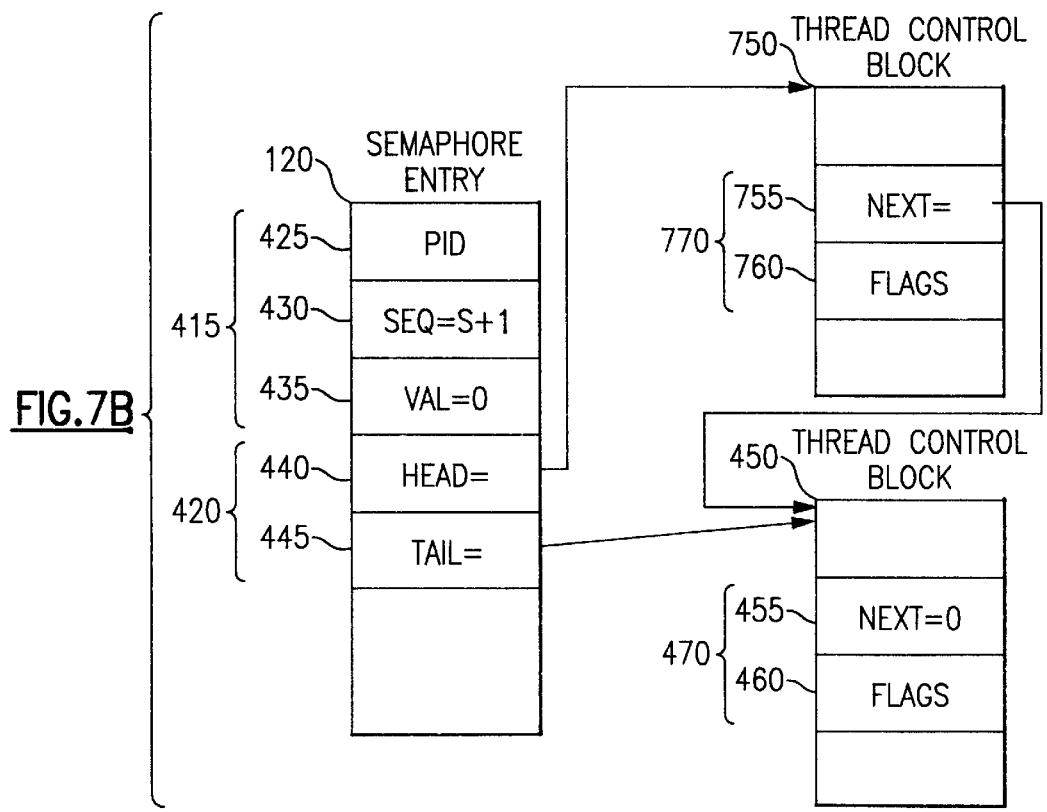
FIG. 7B shows a request for the semaphore when the semaphore is not available and the wait queue is not empty, after the compare and swap operation .

The next test shown as case 2 determines that the semaphore is not available (step 514). Not available can be the traditional case where the semval equals 0 or when there are waiters on the wait queue 370, but this thread is not the one that was posted to be next to get the semaphore. This second condition for the semaphore not being available prevents new semaphore requests from cutting in front of semaphore requests that have been waiting. In this case, the processing is as shown in FIGS. 7A–7B (step 516).

Figure 5B:
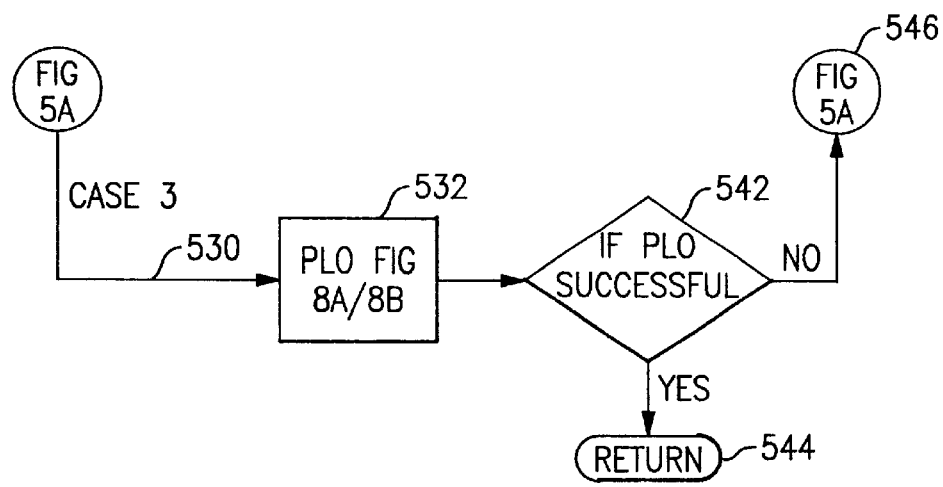
FIG. 5B continues the logic of semaphore processing for the case where the semaphore is available and the request is to obtain the semaphore.

If neither of these cases apply, processing continues as shown in FIG. 5B (step 522).

If the processing occurred for case 1 or 2, then control returns to FIG. 5A at step 524, where the success of the semaphore manipulation is tested. If everything went OK, then the calling thread is placed in a wait state (step 526). The thread remains in a wait state until the owning thread releases the semaphore. If the semaphore manipulation was not successful, then it loops back to step 508 and tries the operation again. Since the reason for the semaphore manipulation failure is because another thread won the race to modify the semaphore state, all the tests starting at step 510 are redone.

Figure 8A:
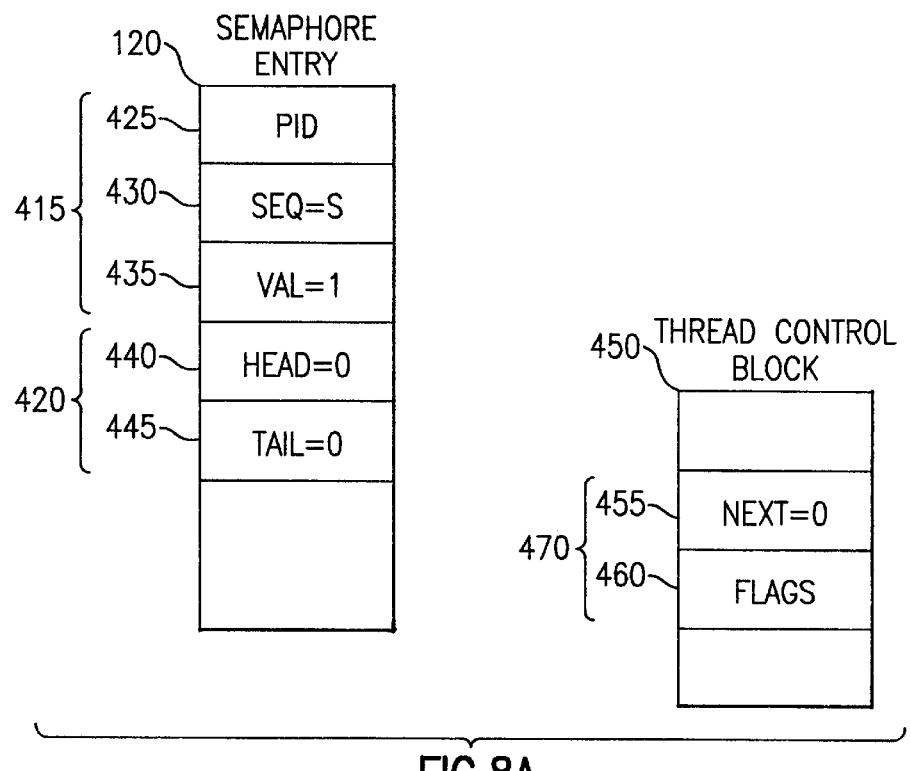
FIG. 8A shows a request for the semaphore when the semaphore is available and the wait queue is empty, before the compare and swap operation.
Figure 8B:
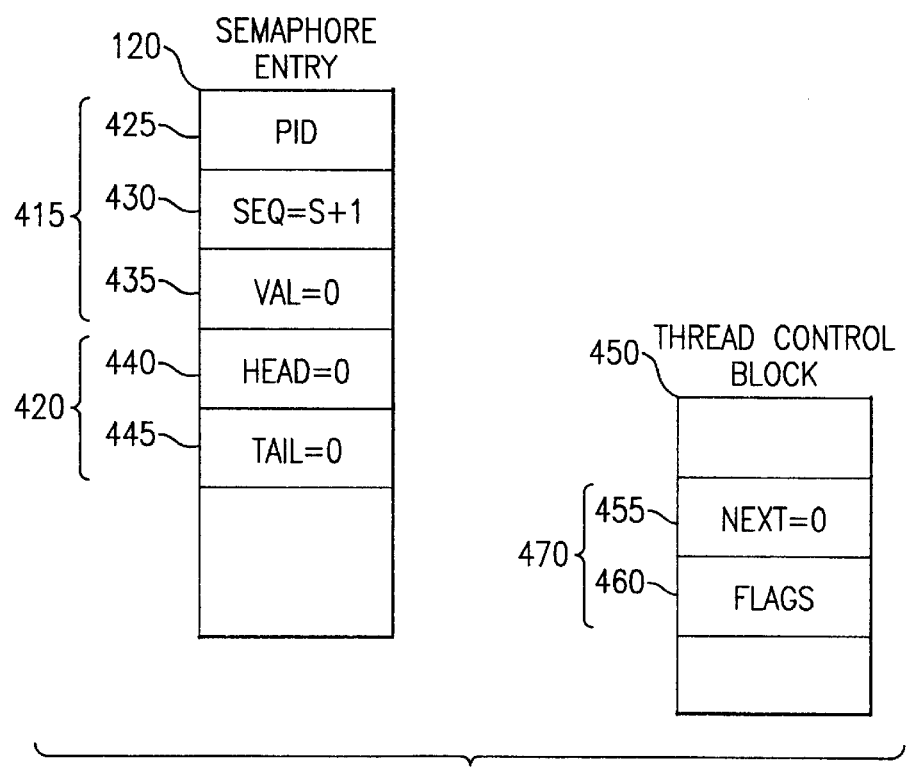
FIG. 8B shows a request for the semaphore when the semaphore is available and the wait queue is empty, after the compare and swap operation.

FIG. 5B covers the case where a semop(-1) is being processed and the semaphore is currently available. If there are no waiters on the wait queue 370 or this thread has been posted to obtain the semaphore, then this is case 3 (step 530), and the processing is as shown in FIGS. 8A–8B (step 532). If the compare and swap operation was successful (step 542), then control returns to the user with the semaphore held (step 544). If the compare and swap operation failed, then processing starts over and returns to FIG. 5A at step 508 (step 546).

Figure 9A:
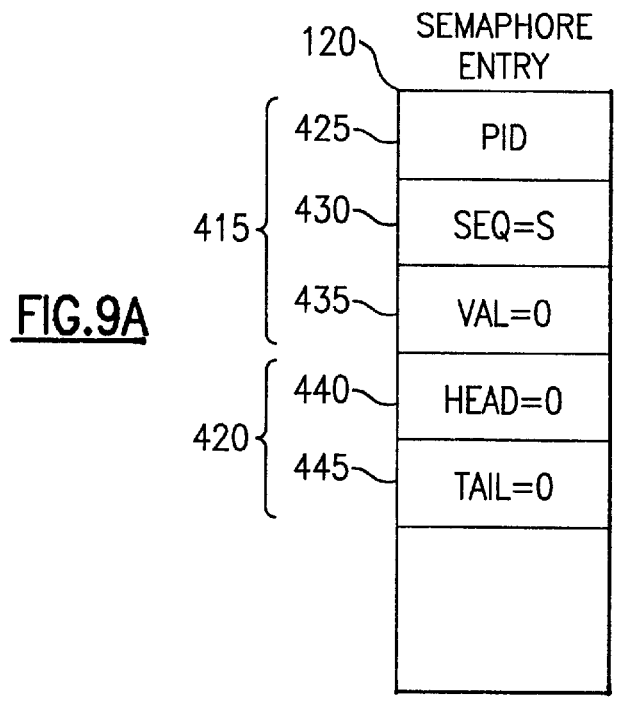
FIG. 9A shows a release of the semaphore when there are no waiters on the wait queue, before the compare and swap operation.
Figure 9B:
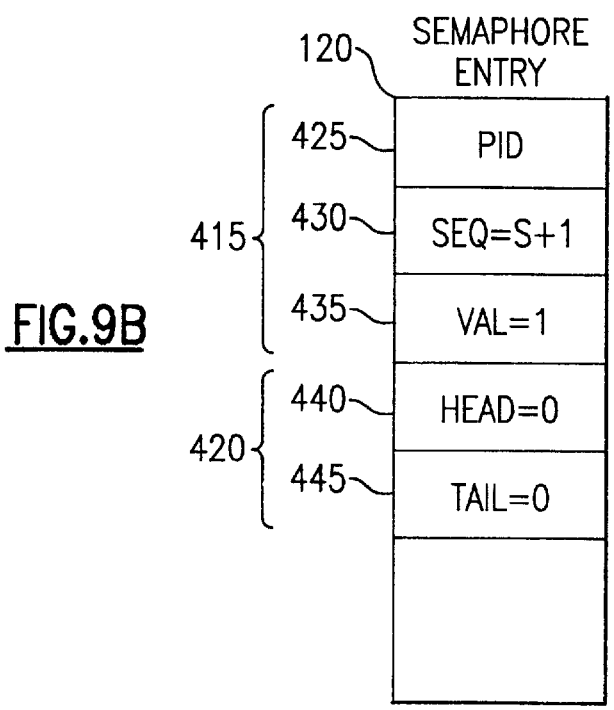
FIG. 9B shows a release of the semaphore when there are no waiters on the wait queue, after the compare and swap operation.

When the test 504 in FIG. 5A detects a semop(+1), control flows to FIG. 5C (step 506). Referring to the latter figure, the semaphore release logic starts with a DO FOREVER loop (step 550). There are 2 cases to consider when releasing a semaphore. Case 4 (step 552) is when there are no waiters on the wait queue 370. The compare and swap operation for case 4 is as shown in FIGS. 9A–9B (step 554). After the semaphore manipulation is attempted, the results of the compare and swap operation are tested (step 560). If the operation was successful, then control returns to the caller (step 566). If the compare and swap operation was not successful, then control returns to step 550 to repeat the attempt to release the semaphore (step 564). The primary reason for a semaphore release to fail is because a new waiter was added to the wait queue 370.

Figure 10A:
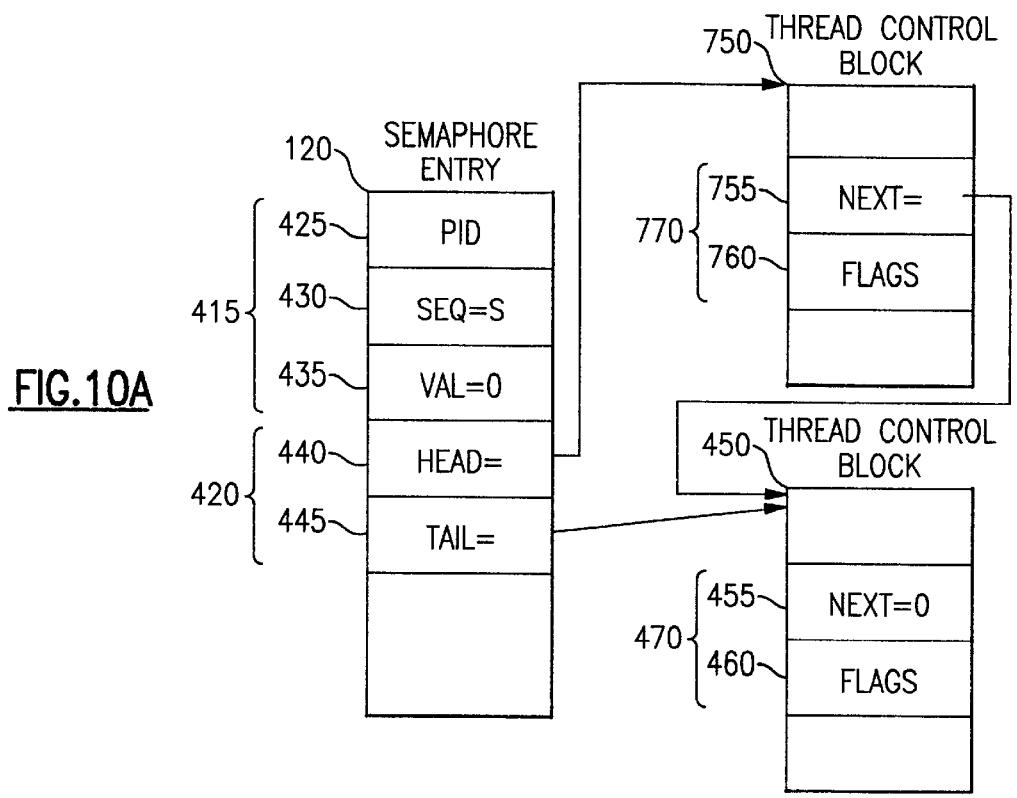
FIG. 10A shows a release of the semaphore when there are waiters on the wait queue, before the compare and swap operation.
Figure 10B:
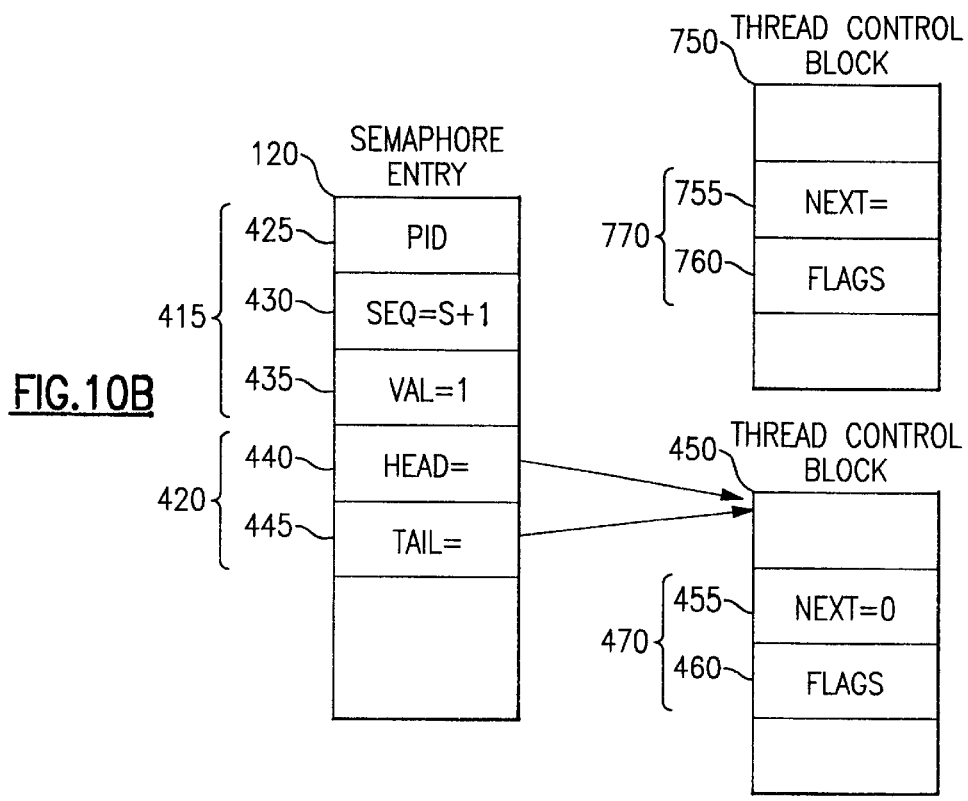
FIG. 10B shows a release of the semaphore when there are waiters on the wait queue, after the compare and swap operation.

Case 5 (step 556) is when there are waiters on the wait queue. The compare and swap operation for case 5 is as shown in FIGS. 10A–10B (step 558). If the operation was successful (step 568), then control flows to FIG. 5D (step 562). If the compare and swap operation was not successful, then control returns to step 550 to repeat the attempt to release the semaphore (step 570). The primary reason for a semaphore release to fail is because a new waiter was added to the wait queue 370.

Figure 5D:
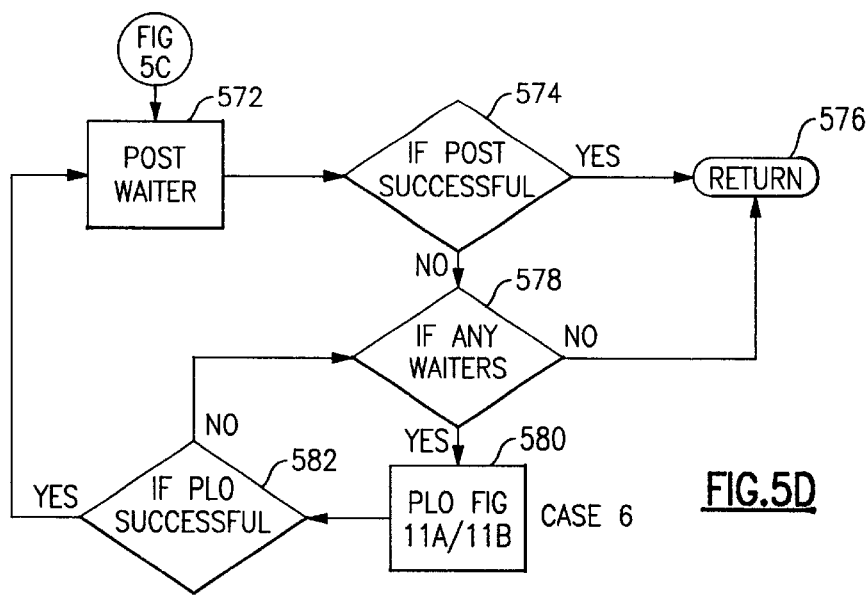
FIG. 5D continues the logic of semaphore processing for a release of the semaphore. This is the case where a waiter is posted. If the post fails, the next waiter is removed from the wait queue and posted. This continues until a waiter is successfully posted or the wait queue is empty.
Figure 11A:
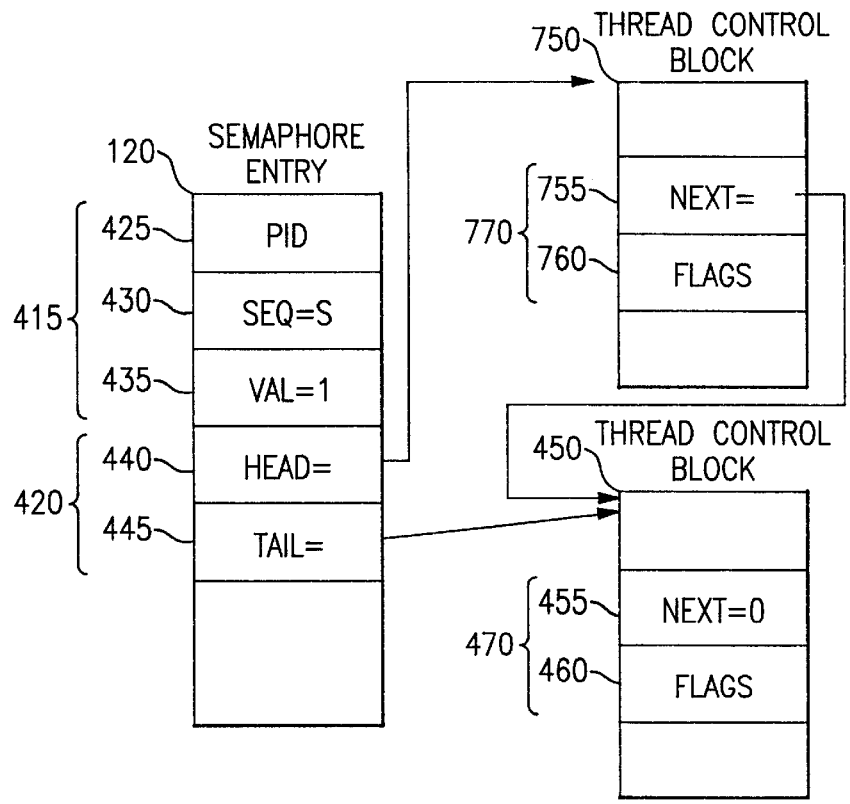
FIG. 11A shows the processing to remove a waiter from the wait queue after the semaphore has already been released, before the compare and swap operation.
Figure 11B:
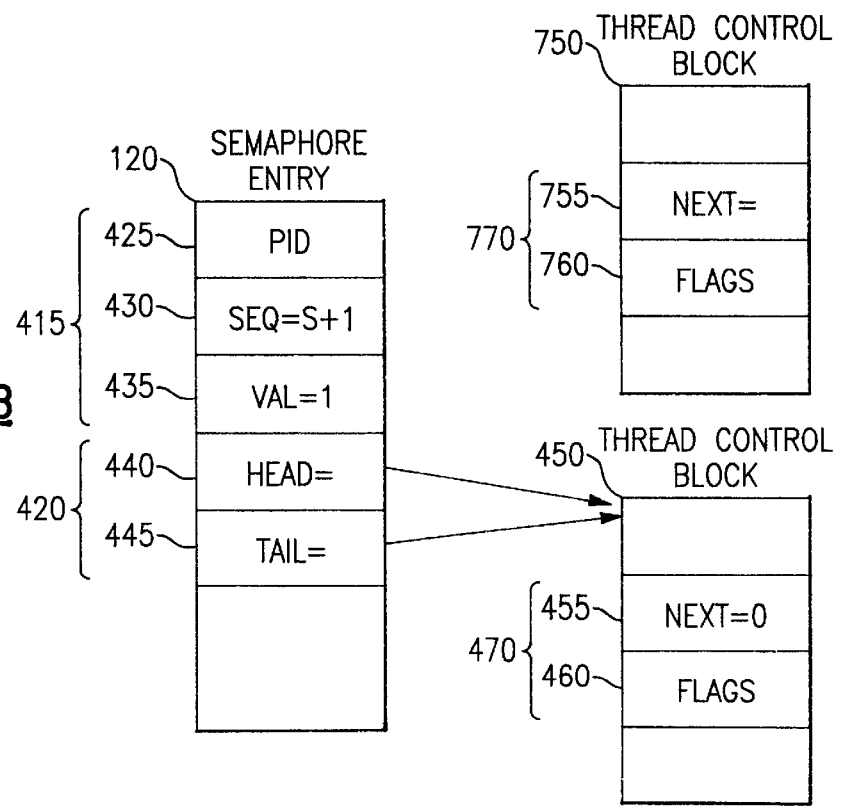
FIG. 11B shows the processing to remove a waiter from the wait queue after the semaphore has already been released, after the compare and swap operation.

FIG. 5D shows the processing that occurs after the semaphore has been released. The first step is to post (i.e., resume) the waiter that was removed from the wait queue 370 in the semaphore release operation in FIG. 5C (step 572). If the post was successful (step 574), then control is returned to the caller (step 576). If the post fails, then a check is made to see if there are waiters on the wait queue 370 (step 578). If there are waiters on the wait queue 370, then the compare and swap operation shown in FIGS. 11A–11B is done to remove the top waiter (step 580). If the compare and swap operation was successful (step 582), then the waiter just removed from the wait queue is posted as before (step 572). If at step 578 there are no waiters on the wait queue 370, then control is returned to the caller (step 576), since there are no waiters to post. The main reason for the post to fail is because the target thread received a signal and is no longer in a wait. If the compare and swap operation fails at step 582, then control returns to the check for more waiters at step 578.

Figure 5E:
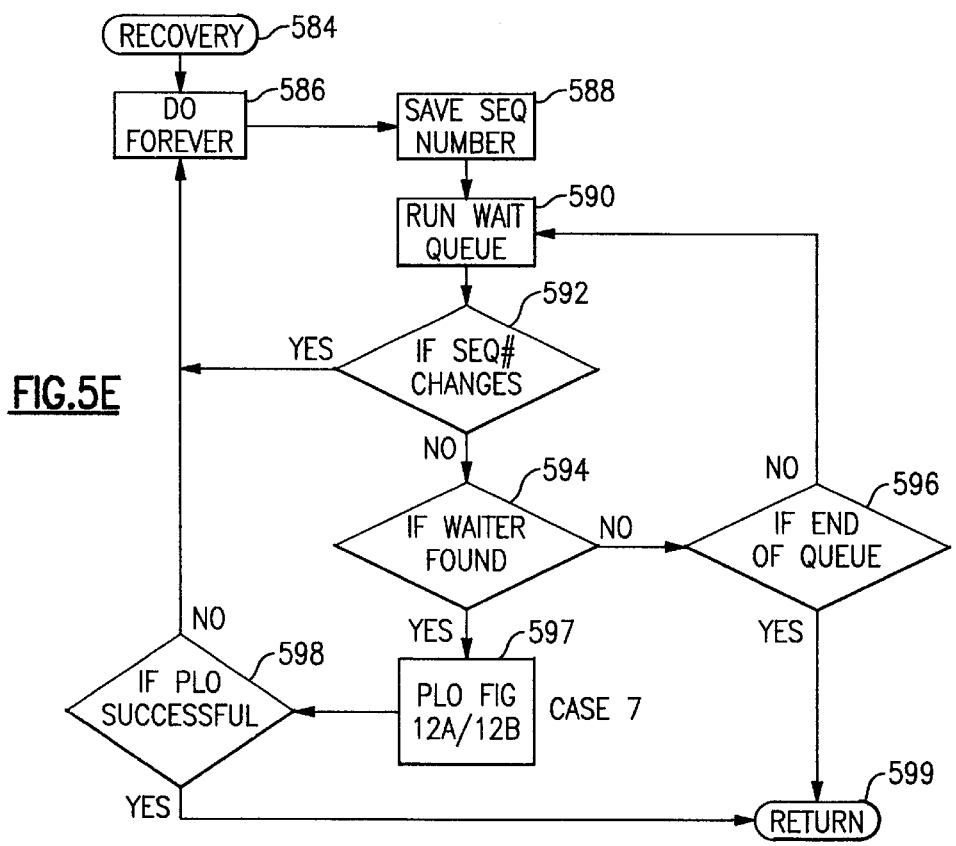
FIG. 5E deals with recovery processing to remove a thread control block from the wait queue.

FIG. 5E shows the recovery flow that occurs beginning at step 584 when a thread has its thread control block on a semaphore wait queue at the time the thread is notified to terminate (possibly a terminating signal). A "do forever" loop is entered (step 586) until the thread control block is successfully removed from the semaphore wait queue or it is determined that the thread control block is no longer on the queue 370. Note that the semaphore could be removed by another process looking to post a waiter. This is the only place where the wait queue 370 is scanned. The semaphore sequence number 430 is saved at the beginning of the loop (step 588). The wait queue 370 is then scanned to find the position of the thread control block on the wait queue (step 590). If the sequence number 430 changes any time during the scan of the queue (step 592), then the loop is started over (step 586). If the element being scanned is not the element for the thread control block in recovery (step 594), then a check is made to see if the end of the queue has been reached (step 596). If the end of the queue is reached, then the thread control block has already been removed and no further processing is required (step 599). If the queue is not done at step 596, then it loops back (step 590). If the waiter element is found at step 594, then the compare and swap operation shown in FIGS. 12–12B is performed to remove the element from the wait queue (step 597). If the compare and swap operation fails (step 598), then the code loops back to the beginning to try again (step 586). If the compare and swap operation is successful, then this thread is no longer on the wait chain and it can proceed with termination (step 599).

Before going into the details of the compare and swap operations shown in FIGS. 6A to 12B, it will be helpful to provide a general understanding of the Perform Locked Operation (PLO) instruction that is used by the preferred embodiment of this invention. The use of the PLO instruction will be described in terms of FIG. 4. Most computer systems contain hardware instructions which make it possible to perform atomic updates to system storage. Some of the previous instructions on the IBM S/390 hardware platform, as described in *Enterprise Systems Architecture/ 390 Principles of Operation*, IBM Publication SA22-7201-02 (1994), incorporated herein by reference, are Compare and Swap (CS), Compare Double and Swap (CDS), and Test and Set (TS). PLO (Perform Locked Operation) is a relatively new atomic instruction on S/390 hardware platforms. Whereas the atomic instructions listed above allow the atomic update of a single word or double word of storage, the PLO instruction allows the atomic update of multiple fields at disjoint locations in storage. The PLO instruction is described in the following pending patent applications and publications, incorporated herein by reference:

S. J. Greenspan et al., "Blocking Symbol Control in a Computer System to Serialize Accessing a Data Resource by Simultaneous Processor Requests", U.S. application Ser. No. 08/864,402, filed May 28, 1997;

S. J. Greenspan et al., "Processor Associated Blocking Symbol Controls for Serializing the Accessing of Data Resources in a Computer System", U.S. application Ser. No. 08/864,585, filed May 28, 1997;

S. J. Greenspan et al., "Method of Executing Perform Locked Operation Instructions for Supporting Recovery of Data Consistency If Lost Due to Processor Failure, and a Method of Recovering the Data Consistency After Processor Failure, U.S. application Ser. No. 08/924,890, filed Sep. 5, 1997;

"ESA/390 Principles of Operation" 7.5.79 via IBM Book-Manager BookServer, http:// ppdbooks.pok.ibm.com/ cgi-bin/bookmgr/bookmgr.cmd/BOOKS/DZ9AR004/ 7.5.69.

The operations provided by the PLO instruction that are used by the present invention are:

1. Compare and swap double with no additional stores. This compares a double-word (64-bit) operand with a double-word comparison value and, if the operand is equal to the comparison value, replaces the compared operand with a double-word replacement value.

This operation is used if a semaphore is being obtained or released and there are no waiters in the queue 370 (FIGS. 8A–8B and 9A–9B). Since there are no required updates to the semaphore queue 370, the only double-word field that is modified is the semaphore field 415.

2. Compare and swap double and store two additional double words. This compares a double-word (64-bit) operand with a double-word comparison value and, if the operand is equal to the comparison value, replaces the compared operand and two additional double-word operands with double-word replacement values.

This operation is used if a first waiter is being added to or removed from the queue (FIGS. 6A–6B, 10A–10B and 11A–11B). Three double-word fields—the semaphore field 415, the queue header 420 and the thread control block 770 of the thread currently at the end of the queue 370 (if a first waiter is being added) or at the head of the queue (if a first waiter is being removed)—are modified.

3. Compare and swap double and store three additional double words. This compares a double-word (64-bit) operand with a double-word comparison value and, if the operand is equal to the comparison value, replaces the compared operand and three additional double-word operands with double-word replacement values.

This operation is used if a subsequent waiter is being added to or removed from the queue 370 (FIGS. 7A–7B and 12A–12B). Four double-word fields—the semaphore field 415, the queue header 420 and the thread control block fields 470 and 770 of the thread being added or removed and its immediate predecessor in the queue 370—are modified.

The compare and swap operation is always performed against field 415. Every time the compare and swap instruction is successful, it means the old value in field 415 did not change from the time that setup started for the compare and swap invocation. If the compare and swap operation is successful, the field 415 is updated. Of particular significance is the update of the sequence number 430. Since the sequence number 430 is always updated, any time two compare and swap operations collide on the same semaphore, only one compare and swap operation completes and the other one loops back to perform the setup again.

In addition to updating the primary semaphore fields 415 on the compare and swap part of the PLO instruction, the instruction is set up to also modify the wait queue fields 420.

When a waiter is removed from the wait queue or the first waiter is added to the wait queue, the wait queue head 440 is updated. Whenever a waiter is added to the end of the wait queue or the first waiter is added, the tail pointer 445 is updated. Whenever a thread control block 450 is added or removed from the wait queue, the flags 460 and possibly the NEXT pointer 455 are updated. Whenever the thread control block 450 is on the wait queue, a flag 460 is set indicating that it is on the wait queue. All of these fields are modified by a single PLO compare and swap instruction.

Figure 13:
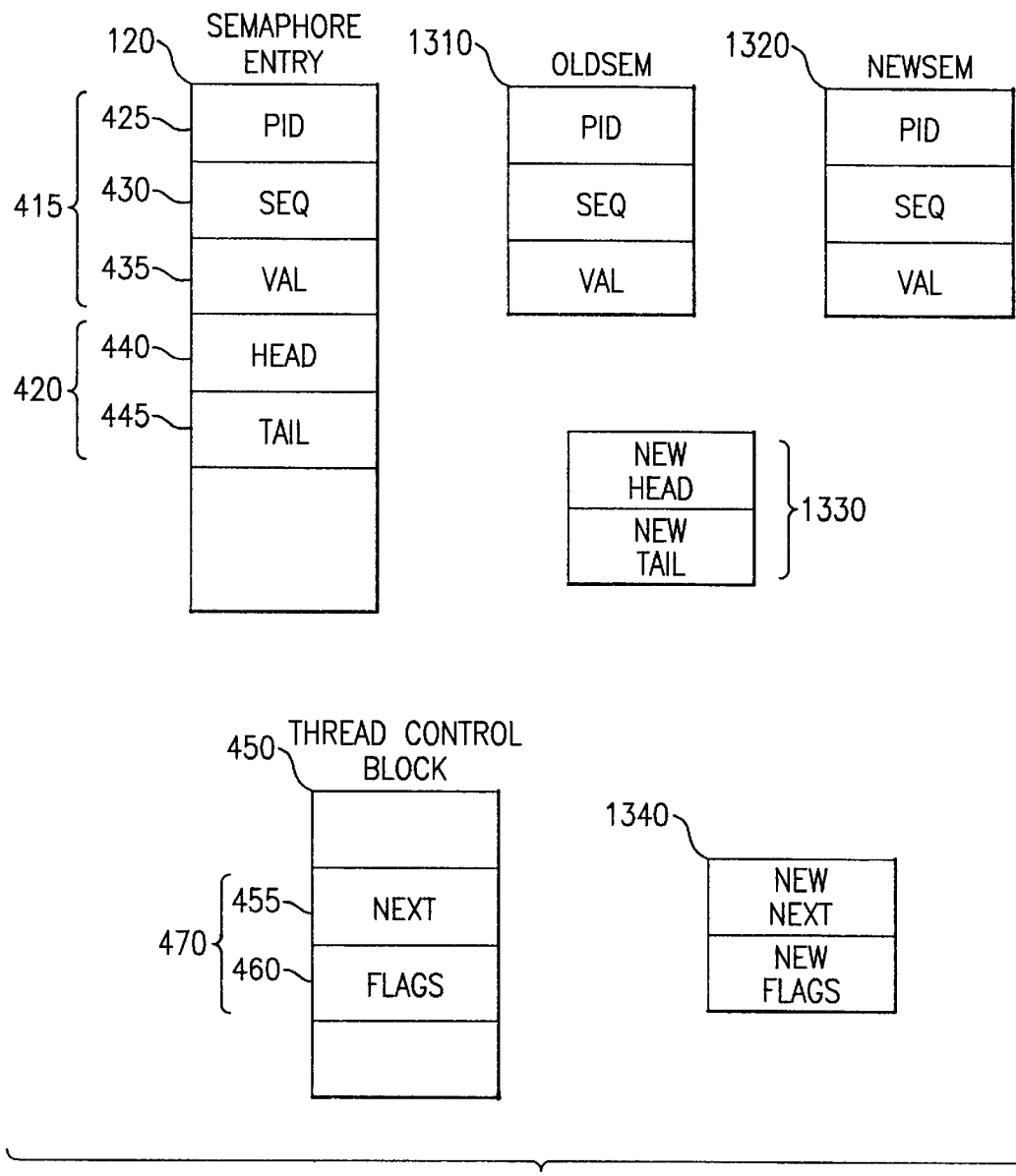
FIG. 13 shows the semaphore and the internal data structures used in performing the compare and swap operation.

FIG. 13 shows a picture of the semaphore and wait queue fields that are frequently referenced in the following explanations. The semaphore field 415 is copied to an area called oldsem 1310 to save the previous value of the semaphore field as a comparison value. Oldsem 1310 is then copied to newsem 1320 and the fields inside of newsem 1320 are updated in accordance with the specified semaphore operation to generate a replacement value for the semaphore field 415. If the queue 370 is being modified by the operation, then replacement values for the wait queue head 440 and tail 445 are constructed in an area marked 1330, while replacement values for a thread control block NEXT and flag field are marked as 1340. When the PLO instruction is thereafter executed, it compares the current value of the semaphore field 415 with the comparison value stored in oldsem 1310. If the values match, indicating no other thread has changed the semaphore, then, atomically with the comparing step, the PLO instruction updates the wait queue 420 with the replacement values 1330, the thread control block NEXT and flag fields 470 with the replacement values 1340 and then the actual semaphore 415 with the replacement value from newsem 1320.

FIG. 6A shows the processing for a semop(−1) when the semaphore is not available (semval=0 435) and the wait queue 370 (as indicated by head pointer 440) is empty. Early in the testing process that got us to the compare and swap setup, the current values of the semaphore fields 415 were saved in oldsem 1310. The addition of a new waiter does not change the semaphore value 435 or the PID 425. As with all of these compare and swap operations, it increments the value of the sequence number 430. So an area called newsem 1320 is created which is the same as oldsem 1310, except that the sequence number 430 is 1 greater. Since the wait queue 370 is currently empty, when we are done adding the new thread control block 450 to the wait queue 370 (as an entry 372), both the head 440 and the tail 445 should be set pointing to the thread control block 450. So in this case, a PLO compare and swap double with two additional stores is done. The additional stores target the queue header 420 and the thread control block field 470. Only the wait flag 460 is modified in field 470, since there is no other waiter.

FIG. 6B shows the contents of the semaphore fields when the compare and swap operation is successful. The sequence number 430 is 1 larger than before. The queue header 440 now points to the thread control block 450 of the calling thread. The queue tail 445 points to the same thread control block 450. The wait flag 460 is set to indicate thread control block 450 is on a semaphore wait chain. If the compare and swap operation fails, semaphore fields 415 and 420 are unaffected. The compare and swap operation fails if another thread wins the race to release the semaphore 415 or another thread wins the race to add itself to the waiter queue. The test for whether the compare and swap operation was successful is in FIG. 5A, step 524.

FIG. 7A shows the processing for a semop(−1) when the semaphore is not available (semval=0 435) and the wait queue 440 is not empty. Early in the testing process that got us to the compare and swap setup, the current value of the semaphore fields 415 were saved in oldsem 1310. The addition of a new waiter does not change the semaphore value 435 or the PID 425. As with all of these compare and swap operations, it increments the value of the sequence number 430. So an area called newsem 1320 is created which is the same as oldsem 1310, except that the sequence number 430 is 1 greater. The wait queue head 440 currently points to thread control block 750 and the tail 445 points to thread control block 750.

When we are done adding the new thread control block 450 to the wait queue 420, the head 440 continues to point to thread control block 750 and the tail 445 is set pointing to the thread control block 450. Since we are adding the calling thread to the end of the queue 370, the NEXT pointer 755 in thread control block 750 is updated to point to the thread control block 450 being added to the queue. In this case, a PLO compare and swap double and triple store targets the semaphore field 415, the queue headers 420, and the thread control block fields 770 and 470.

FIG. 7B shows the contents of the semaphore fields when the compare and swap operation is successful. The sequence number 430 is 1 larger than before. The queue header 440 still points to the thread control block 750. The queue tail 445 points to the new thread control block 450. The NEXT pointer 755 in thread control block 750 now points to thread control block 450, and the wait flag 460 in thread control block 450 is modified to indicate that the thread is waiting on a queue. If the compare and swap operation fails, none of the fields are modified. The compare and swap operation fails if another thread wins the race to release the semaphore or another thread wins the race to add itself to the waiter queue. The test for whether the compare and swap operation was successful is in FIG. 5A, step 524.

FIG. 8A shows the processing for a semop(−1) when the semaphore is available (semval=1 435). Early in the testing process that got us to the compare and swap setup, the current values of the semaphore fields 415 were saved in oldsem 1310. An area called newsem 1320 is created and initialized with a copy of oldsem 1310. In the newsem 1320 copy, the PID is set to the Process ID of the caller, the sequence number is incremented by 1 and the semaphore value is changed from one to zero. Since the wait queue 420 is not affected by this operation, these fields are not modified. The compare and swap operation performed is the simple compare double and swap with no additional stores.

FIG. 8B shows the contents of the semaphore fields when the compare and swap operation is successful. The sequence number 430 is 1 larger than before. The PID field 425 has the Process ID of the caller. The semaphore value 435 is now zero indicating that the semaphore is held. The wait queue 420 is unchanged. If the compare and swap operation fails, none of the fields are modified. The most likely reason for the compare and swap operation failing is if another thread has won the race to obtain the semaphore. The test for whether the compare and swap operation was successful is in FIG. 5B, step 542.

FIG. 9A shows the processing for a semop(+1) which is a caller releasing a semaphore that was previously obtained. In this case there are no waiters for the semaphore. Early in the testing process that got us to the compare and swap setup, the current values of the semaphore fields 415 were saved in oldsem 1310. An area called newsem 1320 is created and initialized with a copy of oldsem 1310. In the newsem 1320 copy, the PID is set to the Process ID of the caller, the sequence number is incremented by 1 and the semaphore value is changed from zero to one. Since there are no waiters, the wait queue 420 is not changed. The compare and swap operation performed is a simple compare double and swap with no additional stores.

FIG. 9B shows the contents of the semaphore fields when the compare and swap operation is successful. The sequence number 430 is 1 larger than before. The PID field 425 has the Process ID of the caller. The semaphore value 435 is now one, indicating that the semaphore is available. The wait queue 420 is empty. If the compare and swap operation fails, none of the fields are modified. The main reason for the compare and swap operation to fail is if another thread is in the process of adding itself to the wait queue. By causing the compare and swap to fail, it prevents this process from releasing the semaphore without posting any waiters. The test for whether the compare and swap operation was successful is in FIG. 5C, step 560.

FIG. 10A shows the processing for a semop(+1) which is a caller releasing a semaphore that was previously obtained. In this case there are waiters for the semaphore. Early in the testing process that got us to the compare and swap setup, the current values of the semaphore fields 415 were saved in oldsem 1310. An area called newsem 1320 is created and initialized with a copy of oldsem 1310. In the newsem 1320 copy, the PID is set to the Process ID of the caller, the sequence number is incremented by 1 and the semaphore value is changed from zero to one. The wait queue 420 is modified to remove the first waiter 750. If there is only one waiter, then both the head 440 and tail 445 are set to zero. If there are multiple waiters, then the head 440 is changed to contain the same value as the first element's 750 NEXT pointer 755 and the tail 445 remains unchanged. The NEXT pointer 755 and the flags 760 are cleared to indicate that thread control block 750 is no longer on the semaphore wait queue. The compare and swap operation performed is a compare double and swap with two additional stores into the queue headers 420 and the thread control block fields 770 of the first waiter.

FIG. 10B shows the contents of the semaphore fields when the compare and swap operation is successful. The sequence number 430 is 1 larger than before. The PID field 425 has the Process ID of the caller. The semaphore value 435 is now one indicating that the semaphore is available. The wait queue header now points to thread control block 450. The NEXT pointer 755 and flags 760 have been cleared. If the compare and swap operation fails, none of the fields are modified. The main reason for the compare and swap to fail is if another thread is in the process of adding itself to the wait queue. By causing the compare and swap to fail, it prevents this process from leaving the wait queue in an invalid state. The test for whether the compare and swap operation was successful is in FIG. 5C, step 560.

FIG. 11A shows the processing for removing the top thread in the wait queue. This occurs at step 580 (FIG. 5D) when the release of a semaphore removes the top waiter thread, but fails in the post to wake it up. In this case, the next waiter must be posted to prevent a hang condition. Early in the testing process that got us to the compare and swap setup, the current values of the semaphore fields 415 were saved in oldsem 1310. An area called newsem 1320 is created and initialized with a copy of oldsem 1310. In the newsem 1320 copy, the PID and semaphore value are unchanged. The sequence number is incremented by 1. The wait queue 420 is modified to remove the first waiter. If there is only one waiter, then both the head 440 and tail 445 are set to zero. If there are multiple waiters, then the head 440 is changed to contain the same value as the first element's 750 NEXT pointer 755 and the tail 445 remains unchanged. The NEXT pointer 755 and the flags 760 are cleared to indicate that thread control block 750 is no longer on the semaphore wait queue. The compare and swap operation performed is a compare double and swap with two additional stores into the queue headers 420 and the thread control block fields 770 of the first waiter.

FIG. 11B shows the contents of the semaphore fields when the compare and swap operation is successful. The sequence number 430 is 1 larger than before. The PID field 425 and semaphore value 435 are unchanged. The wait queue header 440 now points to thread control block 450 and the tail pointer 445 is unchanged. If the last thread control block is removed from the queue, then the head 440 is zero and the tail 445 is also zero. In the thread control block 750 that is removed, the NEXT pointer 755 and wait flag 760 are cleared. If the compare and swap operation fails, none of the fields are modified. The main reason for the compare and swap to fail is if another thread is in the process of adding itself to the wait queue. By causing the compare and swap to fail, it prevents this process from leaving the wait queue in an invalid state. The test for whether the compare and swap operation was successful is in FIG. 5D, step 574.

Figure 12A:
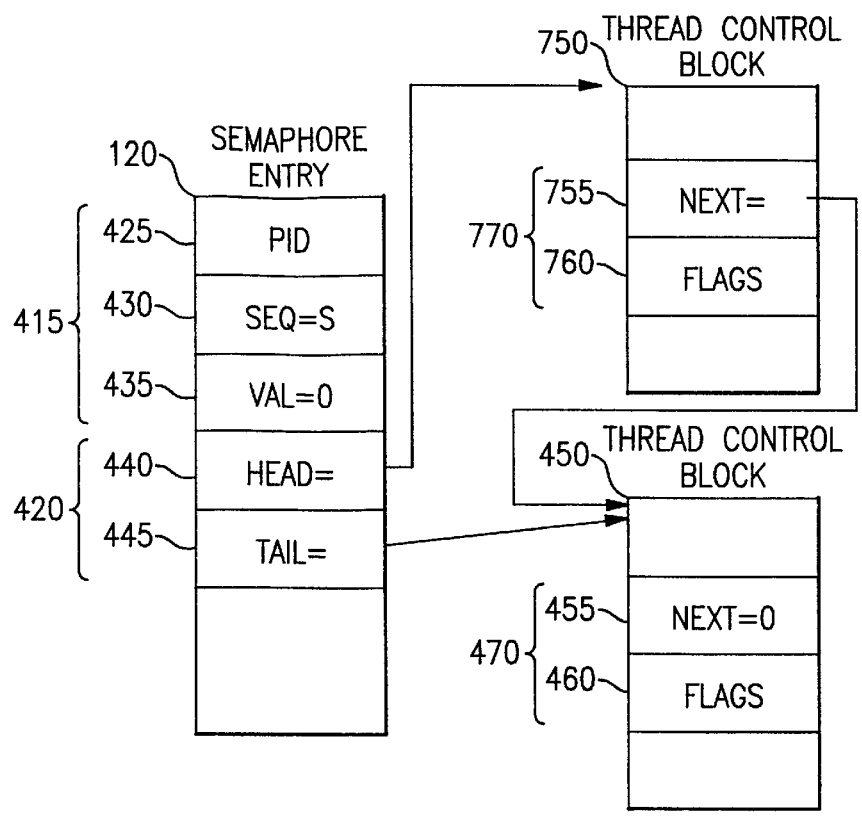
FIG. 12A shows recovery processing to remove a thread control block from the wait queue, since the thread is terminating, before the compare and swap operation.
Figure 12B:
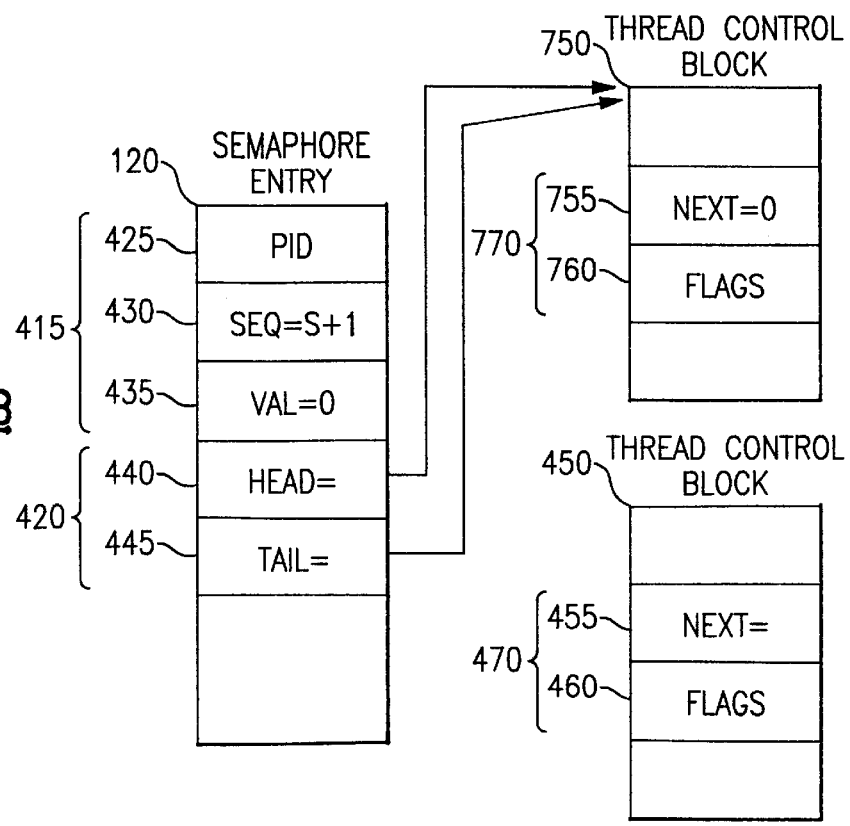
FIG. 12B shows recovery processing to remove a thread control block from the wait queue, since the thread is terminating, after the compare and swap operation.

FIG. 12A shows the processing for removing a thread that is waiting for the semaphore at step 597 (FIG. 5E) when the thread enters recovery. The current values of the semaphore fields 415 are saved in oldsem 1310. An area called newsem 1320 is created and initialized with a copy of oldsem 1310. In the newsem 1320 copy, the PID is left unchanged since the PID is only changed when the call modifies the semaphore value 435. The sequence number 430 is incremented by 1. In the flow from FIG. 5E, the thread control block 450 to be removed has been located on the queue and thread control block 750 is currently pointing to it with the NEXT 755 field. The compare and swap operation removes element 450 from the wait queue 420.

In this example, the head 440 remains unchanged, the tail 445 is changed to point to element 750, since element 450 is currently at the end of the wait queue and its removal changes the tail 445 pointer. The NEXT pointer 755 is changed to point to whatever was in thread control block 450 NEXT pointer 455. In this case, the value in NEXT 455 is zero. The NEXT pointer 455 and wait flag 460 are cleared. The compare and swap operation performed is a compare double and swap with three additional stores into the wait queue fields 420, the thread control block fields 770 and the thread control block fields 470.

If the thread in question is neither the first nor the last waiter in the queue 370, only semaphore field 415 and the thread control block fields 770 and 470 are updated; the queue pointer field 420 remains the same. If the compare double and swap with three additional stores is used for this scenario, then the queue pointer field 420 is simply updated with its former contents.

FIG. 12B shows the contents of the semaphore fields when the compare and swap operation is successful. The sequence number 430 is 1 larger than before. The PID field 425 and semaphore value 435 are unchanged. The wait queue header still points to thread control block 750 and the tail pointer 445 now points to thread control block 750. If the last thread control block is removed from the queue, then the head 440 is zero and the tail 445 is also zero. The NEXT pointer 755 is now zero. The NEXT pointer 455 and wait flag 460 are cleared to indicate that thread control block 450 is no longer on the wait queue. If the compare and swap operation fails, none of the fields are modified. By causing the compare and swap to fail, it prevents this process from leaving the wait queue in an invalid state. The test for whether the compare and swap operation was successful is in FIG. 5E, step 590.

The invention is preferably implemented as software (i.e., a machine-readable program of instructions tangibly embodied on a program storage device) executing on a hardware machine. While a particular embodiment has been shown and described, it will be apparent to those skilled in the art that various modifications may be made without departing from the spirit of the invention. Thus, while the invention has been described as using the Perform Locked Operation (PLO) instruction on the IBM S/390 hardware platform, the invention is not limited to this instruction on this platform, but may be used in other environments as well. Further, while the invention has been described as implementing a binary semaphore, the invention is not limited to binary semaphores, but may be used with appropriate modifications for counting semaphores as well.

What is claimed is:

1. In an information handling system in which a semaphore is used to serialize access to a shared resource, a method of handling a request from a requester to perform a specified operation on the semaphore, the semaphore having a first semaphore field containing a value and a second semaphore field containing a pointer to a queue for the semaphore, the queue having zero or more entries corresponding to waiters for the semaphore, each entry with a next entry having a pointer to that next entry, the method comprising the steps of:

saving a previous value of the first semaphore field as a comparison value;

generating, in accordance with the specified operation, a first replacement value for the first semaphore field as a first operand and, if the queue is being modified by the operation, one or both of a second replacement value for the second semaphore field as a second operand and a third replacement value for one of the queue entries as a third operand; and thereafter atomically comparing a current value of the first semaphore field with the comparison value and, if the current value matches the comparison value, replacing the first operand with the first replacement value and, if the queue is being modified by the operation, replacing one or both of the second and third operands with their corresponding replacement values.

2. The method of claim 1 in which the first semaphore field contains an identifier of a last requester to update the semaphore.

3. The method of claim 1 in which the first semaphore field contains a sequence number.

4. The method of claim 3 in which the comparing step comprises the step of:

comparing the sequence number of the current value of the first semaphore field with the sequence number of the comparison value.

5. The method of claim 3 in which the generating step comprises the steps of:

incrementing the sequence number contained in the previous value of the first semaphore field to generate an incremented sequence number; and generating a first replacement value containing the incremented sequence number.

6. The method of claim 1 in which the semaphore is a binary semaphore having one of two semaphore values.

7. The method of claim 1 in which the specified operation comprises decrementing the semaphore value.

8. The method of claim 1 in which the specified operation comprises incrementing the semaphore value.

9. The method of claim 1 in which the second semaphore field contains a pointer to a first waiter for the semaphore.

10. The method of claim 1 in which the second semaphore field contains a pointer to a last waiter for the semaphore.

11. The method of claim 1 in which the request is a request to obtain the semaphore, the step of generating the replacement values comprising the steps of:

examining the semaphore value to determine whether the semaphore is available;

if the semaphore value indicates that the semaphore is available, decrementing the semaphore value to generate a first replacement value;

if the semaphore value indicates that the semaphore is not available, determining whether there are any waiters for the semaphore;

if there are no waiters for the semaphore, modifying the queue pointer to point to the requester as a new first waiter to generate a second replacement value; and if there are one or more waiters for the semaphore, modifying the queue entry of a current last waiter to point to the requester as a new last waiter to generate a third replacement value.

12. The method of claim 1 in which the request is a request to release the semaphore from a requester holding the semaphore, the step of generating the replacement value comprising the steps of:

incrementing the semaphore value to generate a first replacement value;

determining whether there are first and second waiters for the semaphore;

if there are first and second waiters for the semaphore, modifying the queue pointer to point to the second waiter as a new first waiter to generate a second replacement value and modifying the queue entry corresponding to the first waiter to remove the first waiter from the queue to generate a third replacement value; and if there is only a first waiter for the semaphore, modifying the queue pointer to indicate an absence of waiters to generate a second replacement value and modifying the queue entry corresponding to the first waiter to remove the first waiter from the queue to generate a third replacement value.

13. The method of claim 1, comprising the further step of:

if the current value of the first semaphore field does not match the comparison value, saving the current value of the first semaphore field as a new comparison value and repeating the generating, comparing and replacing steps.

14. The method of claim 1 in which said comparing and replacing steps are performed using a single hardware instruction that compares an operand with a comparison value and, if the operand is equal to the comparison value, replaces the compared operand and, optionally, additional operands with replacement values.

15. The method of claim 1 in which each queue entry comprises a control block for the corresponding requester.

16. The method of claim 15 in which each control block contains a pointer to a next entry in the queue.

17. The method of claim 16 in which each control block contains a flag indicating whether the requester is waiting on a queue.

18. The method of claim 1 in which the generating step further comprises generating replacement values for a pair of queue entries and the replacing step comprises replacing the pair of queue entries with their corresponding replacement values.

19. In an information handling system in which a semaphore is used to serialize access to a shared resource, apparatus for handling a request from a requester to perform a specified operation on the semaphore, the semaphore having a first semaphore field containing a value and a second semaphore field containing a pointer to a queue for the semaphore, the queue having zero or more entries corresponding to waiters for the semaphore, each entry with a next entry having a pointer to that next entry, the apparatus comprising:

means for saving a previous value of the first semaphore field as a comparison value;

means for generating, in accordance with the specified operation, a first replacement value for the first semaphore field as a first operand and, if the queue is being modified by the operation, one or both of a second replacement value for the second semaphore field as a second operand and a third replacement value for one of the queue entries as a third operand; and means for thereafter atomically comparing a current value of the first semaphore field with the comparison value and, if the current value matches the comparison value, replacing the first operand with the first replacement value and, if the queue is being modified by the operation, replacing one or both of the second and third operands with their corresponding replacement values.

20. A program storage device readable by a machine, tangibly embodying a program of instructions executable by the machine to perform method steps for handling a request from a requester to perform a specified operation on a semaphore in an information handling system in which a semaphore is used to serialize access to a shared resource, the semaphore having a first semaphore field containing a value and a second semaphore field containing a pointer to a queue for the semaphore, the queue having zero or more entries corresponding to waiters for the semaphore, each entry with a next entry having a pointer to that next entry, the method steps comprising:

saving a previous value of the first semaphore field as a comparison value;

generating, in accordance with the specified operation, a first replacement value for the first semaphore field as a first operand and, if the queue is being modified by the operation, one or both of a second replacement value for the second semaphore field as a second operand and a third replacement value for one of the queue entries as a third operand; and thereafter atomically comparing a current value of the first semaphore field with the comparison value and, if the current value matches the comparison value, replacing the first operand with the first replacement value and, if the queue is being modified by the operation, replacing one or both of the second and third operands with their corresponding replacement values.

* * * * *